Aug. 26, 1958

R. LUCIEN 2,849,560

APPARATUS FOR THE AUTOMATIC CONTROL OF THE
BRAKING OF A WHEEL OF A VEHICLE

Filed Nov. 21, 1957

Aug. 26, 1958    R. LUCIEN    2,849,560
APPARATUS FOR THE AUTOMATIC CONTROL OF THE
BRAKING OF A WHEEL OF A VEHICLE
Filed Nov. 21, 1957    2 Sheets-Sheet 2

United States Patent Office 2,849,560
Patented Aug. 26, 1958

2,849,560

APPARATUS FOR THE AUTOMATIC CONTROL OF THE BRAKING OF A WHEEL OF A VEHICLE

René Lucien, Neuilly-sur-Seine, France, assignor to Recherches Etudes Production R. E. P., Paris, France, a corporation of France Application November 21, 1957, Serial No. 697,992

Claims priority, application France August 29, 1957

7 Claims. (Cl. 200—80)

This invention relates to braking devices. More particularly, the present invention contemplates an apparatus for the automatic control of the braking of a wheel of a vehicle, and especially of an automobile, in which the braking is effected by the pressure of a hydraulic fluid. The apparatus employs a conventional inertia flywheel, influenced by the decelerations of the wheel due to braking action, and the flywheel is used in combination with an electro-valve inserted in the hydraulic braking circuit.

As long as the wheel rotates at an accelerated or uniform speed, or as long as its deceleration does not exceed an undesirable value, the braking controller interrupts the electric circuit in the coil of the electro-valve which then admits pressure fluid to an associated braking member under the control of a brake-pedal operated by the driver. On the other hand, if the deceleration reaches the inadmissible value, the braking controller closes the circuit to the electro-valve which then puts the pressure fluid in communication with a reservoir. The braking action is then momentarily interrupted until the deceleration returns to normal, even if the driver continues to act on the brake-pedal.

An object of the invention is to produce a braking controller of the type referred to above from simple members, adapted to be manufactured by mass production and at a low production cost, and being simple to mount and adjust.

The apparatus which will now be described is illustrated in the accompanying drawings, in which.

Figure 1:
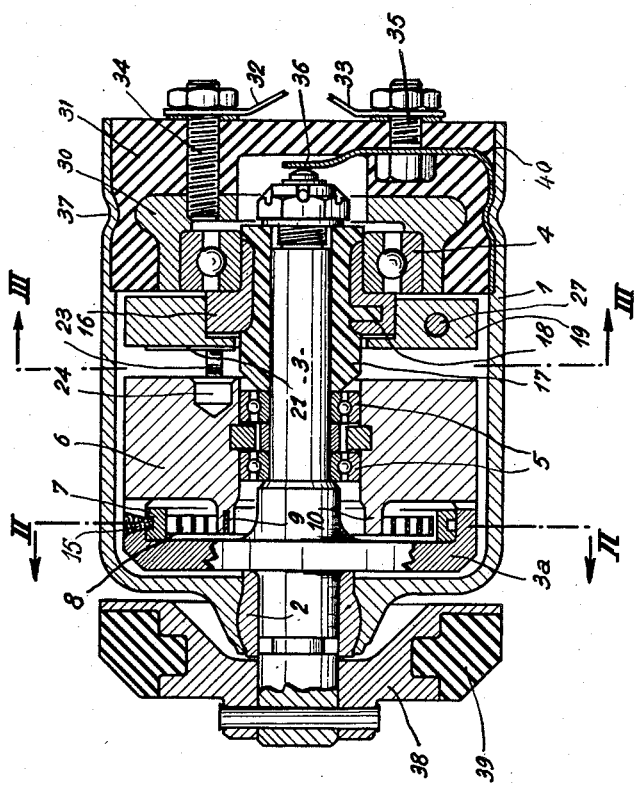
Fig. 1 shows an axial cross-section of an embodiment of the invention.
Figure 2:
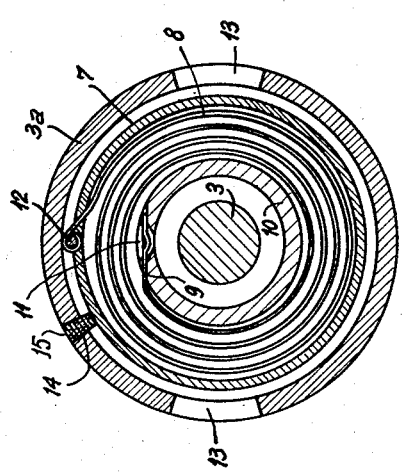
Fig. 2 shows a transverse cross-section along line II—II of Fig. 1.
Figure 3:
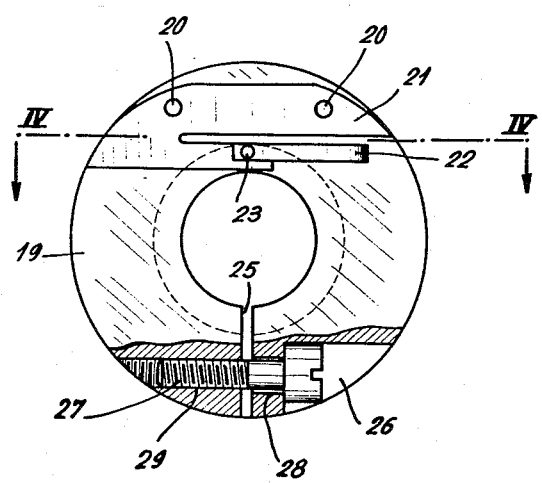
Fig. 3 is a view along line III—III of Fig. 1 showing a detail of the apparatus.

The apparatus comprises a cylindrical casing 1 of sheet steel, completely open at one extremity, the other extremity having a bottom with a central opening forming a housing for an inset sintered self-lubricating ring 2 with an external swivel joint. This ring serves as a bearing for one extremity of a shaft 3, the other extremity of which is carried by a ball-bearing 4, as will be seen.

The housing of the ring 2 is made by cold punching.

This swivel ring enables an alignment of the shaft to be obtained, while enabling fairly wide tolerances on the machined parts.

The shaft 3 comprises a shoulder 3a of dished form, opposite which is mounted an inertia fly-wheel 6 which is free to rotate on bearings 5. An elastic coupling is provided between the dished shoulder and the fly-wheel by means of a ring 7, rigidly fixed to the shoulder, and a spiral spring 8.

The inner extremity of the spring 8 is engaged in a slot 9 of an annular extension 10 of the fly-wheel 6. This slot 9 extends on each side of a drilled portion 11 of the annular extension 10. The inner extremity of the spring is fixed in this slot by being deformed by punching. The other extremity of the spring 8 is fixed to the ring 7 by being engaged in a slot in this ring and by being folded back on itself to form a loop 12. The angular movements of the shoulder 3a and the fly-wheel 6 are limited by catches (not shown), which are fixed to the fly-wheel and are engaged and movable in castellations 13 which constitute stops and are formed in the edge of the dished shoulder 3a. The spring is pre-stressed by rotating the ring 7 in its housing in the required direction. The catches then abut one of the extremities of the castellations 13 and when the required pre-stress has been obtained, the ring 7 is fixed relative to the dished shoulder 3a. To this end, one of the following means can be employed. Through one or a number of lateral passages 14 in the dished shoulder 3a, a weld material 15 is poured, or alternatively the ring 7 is tinned before assembly and a powerful electric current is passed between the ring 7 and the shaft 3 which causes the tin to melt and thus welds the ring to the inside of the dished shoulder.

Between the rear portion of the shaft 3 and a centering member 16 is moulded a piece of insulating material 17. In order to improve the fixing of the pieces 16 and 17, radial passages 18 are provided in the centering member 16, into which passages the plastic material penetrates during moulding.

Figure 4:
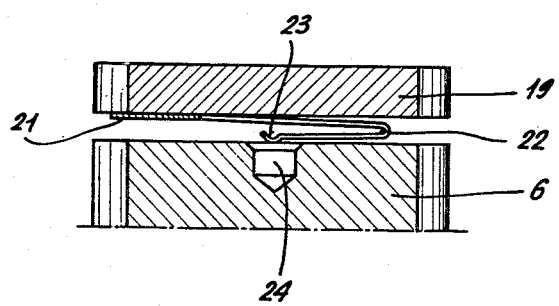
Fig. 4 shows a cross-section along line IV—IV of Fig. 3.

On the centering member 16 is rigidly fixed a ring 19, and on this ring is fixed by two screws 20 facing the flywheel 6, a plate 21 stamped out so as to form a tongue 22 which is folded back on itself in the shape of a hairpin. This plate is of metal and the hairpin thus has a certain elasticity. The ring 19 is at a suitable distance from the fly-wheel 6 in order that the slightly-curved extremity 23 of the tongue applies a pressure on the flat surface of the fly-wheel 6. In addition, the ring 19 is suitably directed angularly on the centering member 16 in order that, when the fly-wheel 6 is in abutment, as noted above, against the castellations 13 of the dished shoulder 3a, the extremity 23 of the hairpin 22 marginally enters a cavity 24 (Figs. 1 and 4) of the fly-wheel 6 without touching the edges thereof; these edges are chamfered in order that, during an angular movement of the fly-wheel 6 with respect to the ring 19, the extremity 23 can pass easily out of the hole 24 and apply a pressure against the flat face of the fly-wheel 6, the flat face constituting a contact at the same time the adjustment of the angular position of the ring 19, in order to obtain a predetermined lost motion in the hole 24, and the adjustment of its longitudinal position so as to obtain the desired pressure, the ring 19 is radially slit at 25 and is notched at 26. A screw 27, rotating freely in a bore 28 and screwing into a coaxial threaded portion 29 enables the ring 19 to be locked on the centering member 16 in the suitable position.

The ball bearing 4 has its inner ring fixed to the centering member 16, while its outer ring is rigidly fixed to a metal member 30, around which has been moulded a mass of hard rubber 31 which makes contact with the casing so as to insure electrical insulation and fluid-tightness. The ball bearing 4 is, it will be noted, insulated from the shaft 3 by piece 17 and from casing 1 by member 31. Two electric contact terminals 32 and 33 are electrically connected by means of bolts 34 and 35 embedded during moulding in the rubber 31, the first to the metallic member 30 and the second to the casing 1 and the shaft 3 by means of an elastic blade 40 which applies pressure to the extremity 36 of the shaft 3. The rubber body 31 is fixed in position inside the casing 1 by a depression 37 in the casing. On the extremity of the shaft 3 which passes out of the casing is keyed a driving fly-wheel 38 which is driven by the wheel, the braking of which is to be controlled. For this purpose, on the fly-wheel 38 is mounted a rubber ring 39 which is rotated by friction with a driving member of any kind which receives a movement of rotation from the wheel.

The operation of the apparatus is as follows: as long as the wheel is not subjected to an excessive deceleration: the fly-wheel 6 accompanies the shaft in its rotation, these two members being fixed to each other by the suitably adjusted tension of the spring 8, and the contact 23 is positioned in the hole 24. No current can then pass from one terminal to the other through the braking controller. On the other hand, if the deceleration exceeds the admissible value, the fly-wheel 6, due to its inertia, then turns faster than the shaft and the contact 23 leaves hole 24 and rubs against the fly-wheel and the spring 8 tightens still further. The current then passes from one terminal to the other, and the electro-valve (not shown) can be excited. The circuit through the controller is in fact as follows: terminal 32, bolt 34, metal member 30, ball bearing 4, centering member 16, ring 19, hairpin 22, contact 23, fly-wheel 6, spiral spring 8, ring 7, dished shoulder 3a, shaft 3, elastic blade 40, bolt 35 and terminal 33. The braking effect is then interrupted; the deceleration is reduced accordingly, the spiral spring expands, the fly-wheel returns to its initial position, the current is cutoff, and so on.

The passage of the current through the bearing 4 is insured by the fact that the latter is lubricated with a grease having sufficient electrical conductivity such as, for example, by the addition of a certain percentage of graphite.

What I claim is:

1. An automatic braking controller for the wheel of a vehicle comprising an inertia fly-wheel, a shaft driven by the wheel of said vehicle, a stop on said shaft, the fly-wheel being rotatably mounted on the shaft for rotation limited by the stop, a spiral spring coupling said fly-wheel to said shaft, a first contact, means supporting said first contact on the shaft for rotation therewith and electrically isolating the first contact from the shaft, a second contact on the fly-wheel to be engaged by the first contact in accordance with the relative rotational displacement between the contacts, a casing, a self-lubricating ring supporting the shaft in said casing, and a ball bearing electrically insulated from the casing and shaft and further supporting the shaft in the casing.

2. A controller as claimed in claim 1 comprising a terminal fixed relative to said casing and electrically insulated therefrom, means electrically coupling said terminal to said ball bearing and said ball bearing to said first contact, and a conductive grease lubricating said ball bearing whereby an electric circuit is constituted between said terminal and first contact.

3. A controller as claimed in claim 1, wherein the spiral spring electrically connects the fly-wheel and shaft, comprising a terminal fixed relative to said casing and a friction contact electrically coupling the terminal and said shaft, the fly-wheel being electrically coupled to said second contact.

4. A controller as claimed in claim 1, wherein the casing defines an open end, comprising a rubber member accommodated in the open end, terminals supported by the rubber member, and means for electrically coupling the terminals to said contacts.

5. A controller as claimed in claim 1, comprising a shoulder rigidly coupled to the shaft, and a ring adapted for being rigidly coupled to the shoulder, said spiral spring being connected to said ring whereby said spring is adjustable.

6. A controller as claimed in claim 1, wherein said second contact is electrically and mechanically integral with said fly-wheel, said fly-wheel defining a chamfered hole adjacent the second contact for freely accommodating the first contact.

7. A controller as claimed in claim 1, wherein the first contact comprises an electrically conductive tongue having the shape of a hairpin, said controller comprising a radially slit annular member for engaging the shaft and supporting the first contact, said annular member being rotationally and axially displaceable on the shaft.

No references cited.